May 18, 1943.   C. C. BENNETT   2,319,655
WHEEL BALANCING APPARATUS
Filed June 24, 1939   5 Sheets-Sheet 1

INVENTOR
CLAUDE C. BENNETT
BY
ATTORNEY

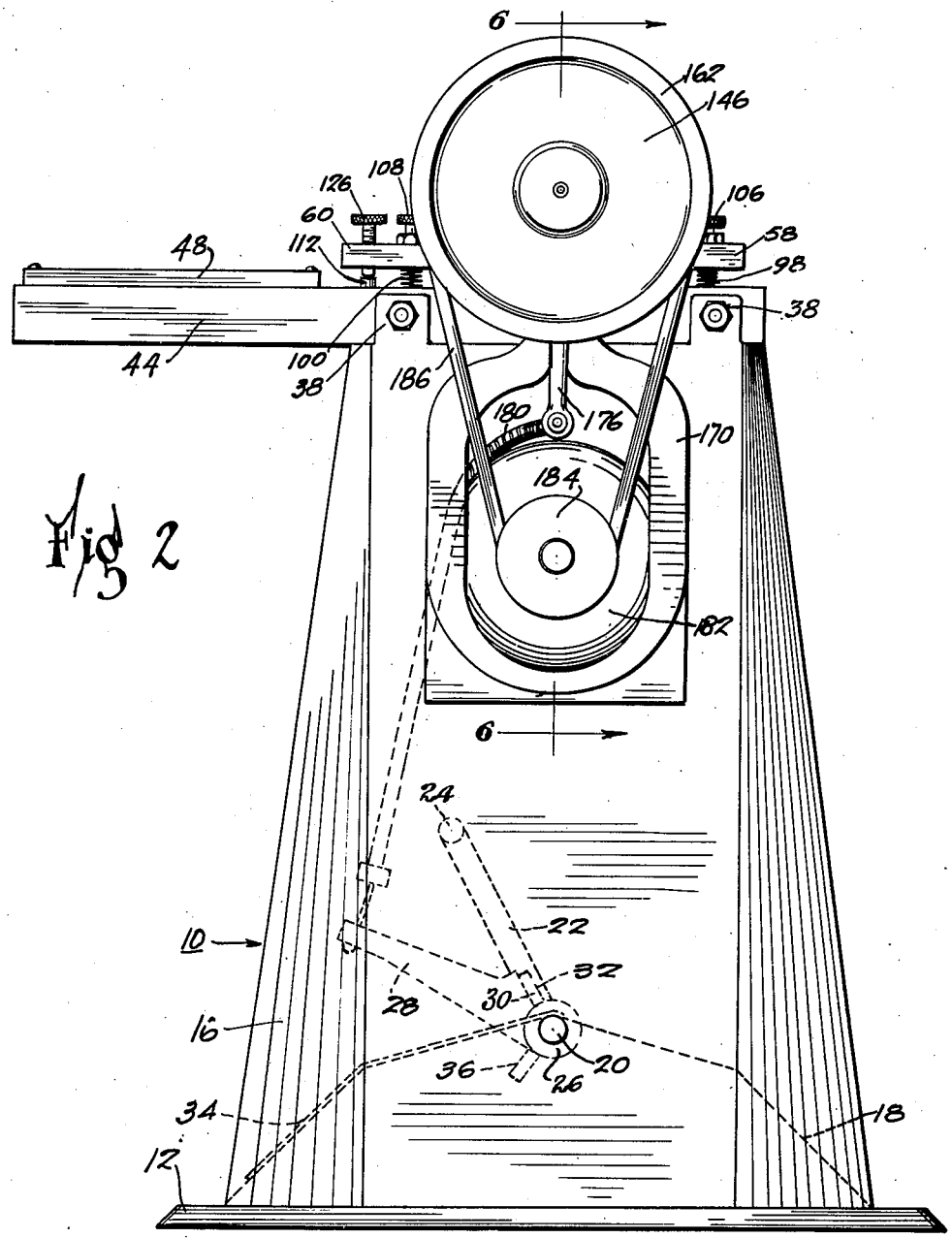

May 18, 1943. C. C. BENNETT 2,319,655
WHEEL BALANCING APPARATUS
Filed June 24, 1939 5 Sheets-Sheet 3
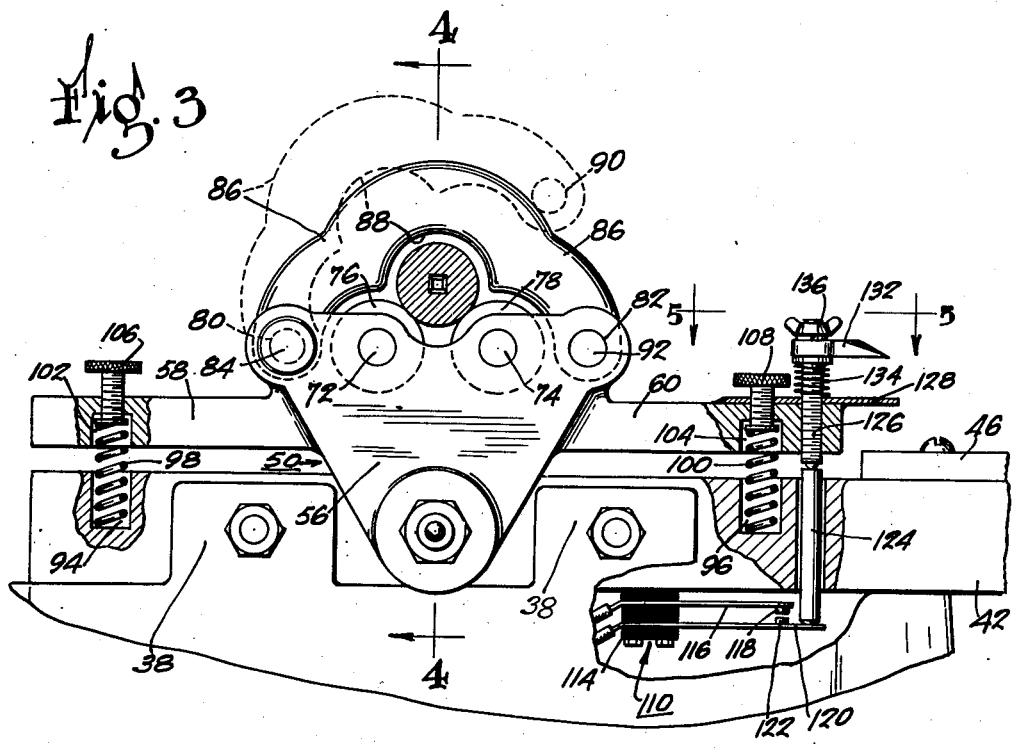
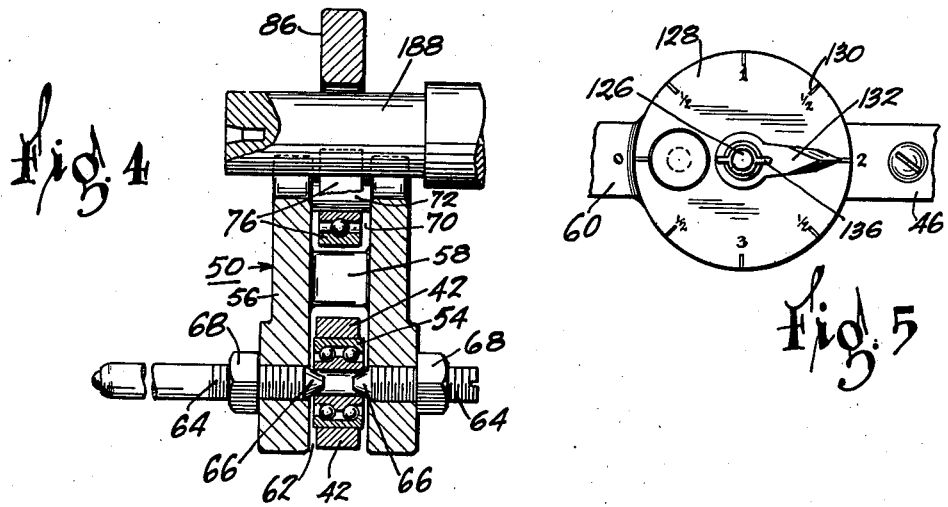
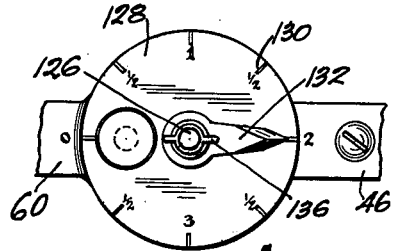
INVENTOR.
CLAUDE C. BENNETT
BY
ATTORNEY.

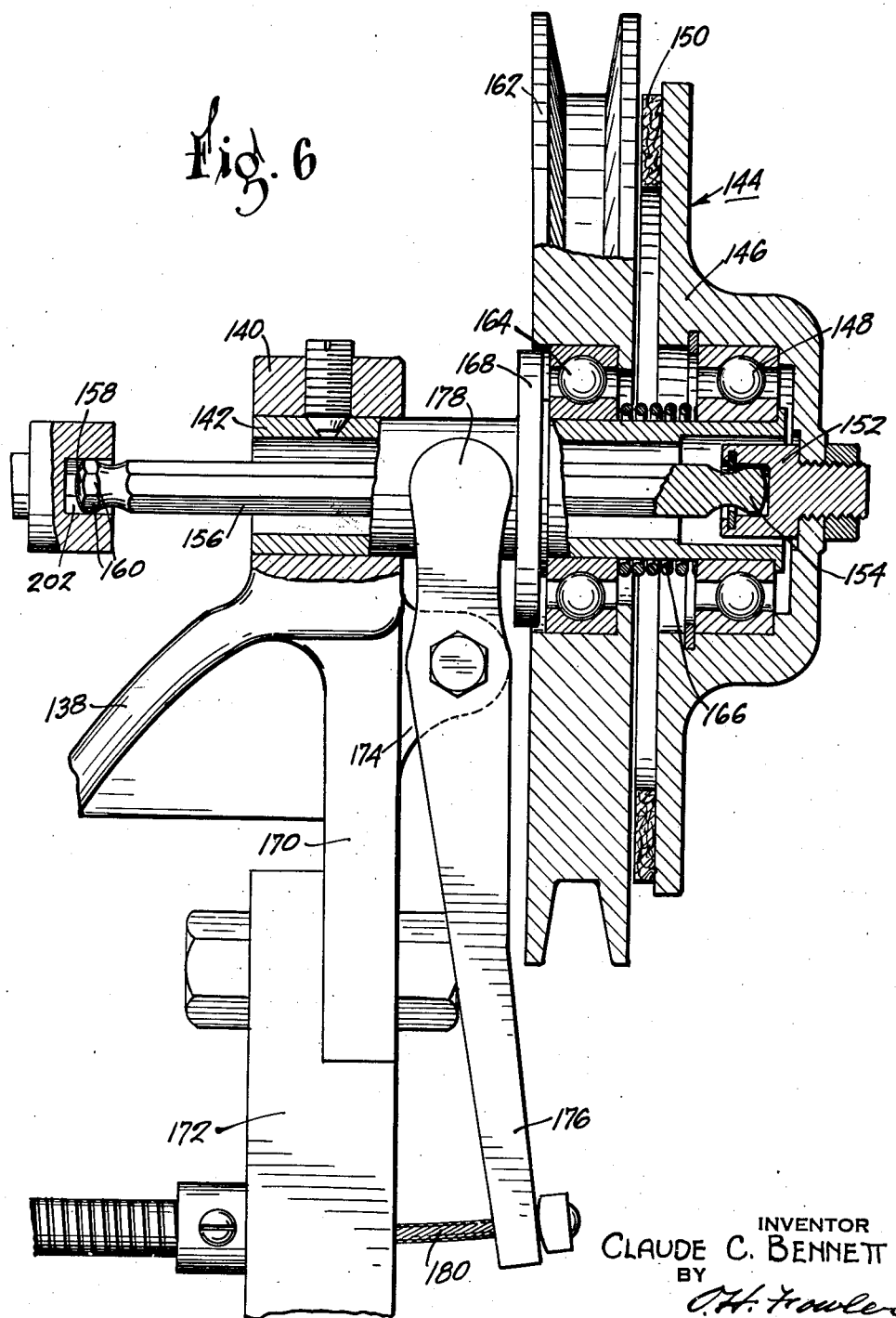

May 18, 1943. C. C. BENNETT 2,319,655
WHEEL BALANCING APPARATUS
Filed June 24, 1939 5 Sheets-Sheet 5
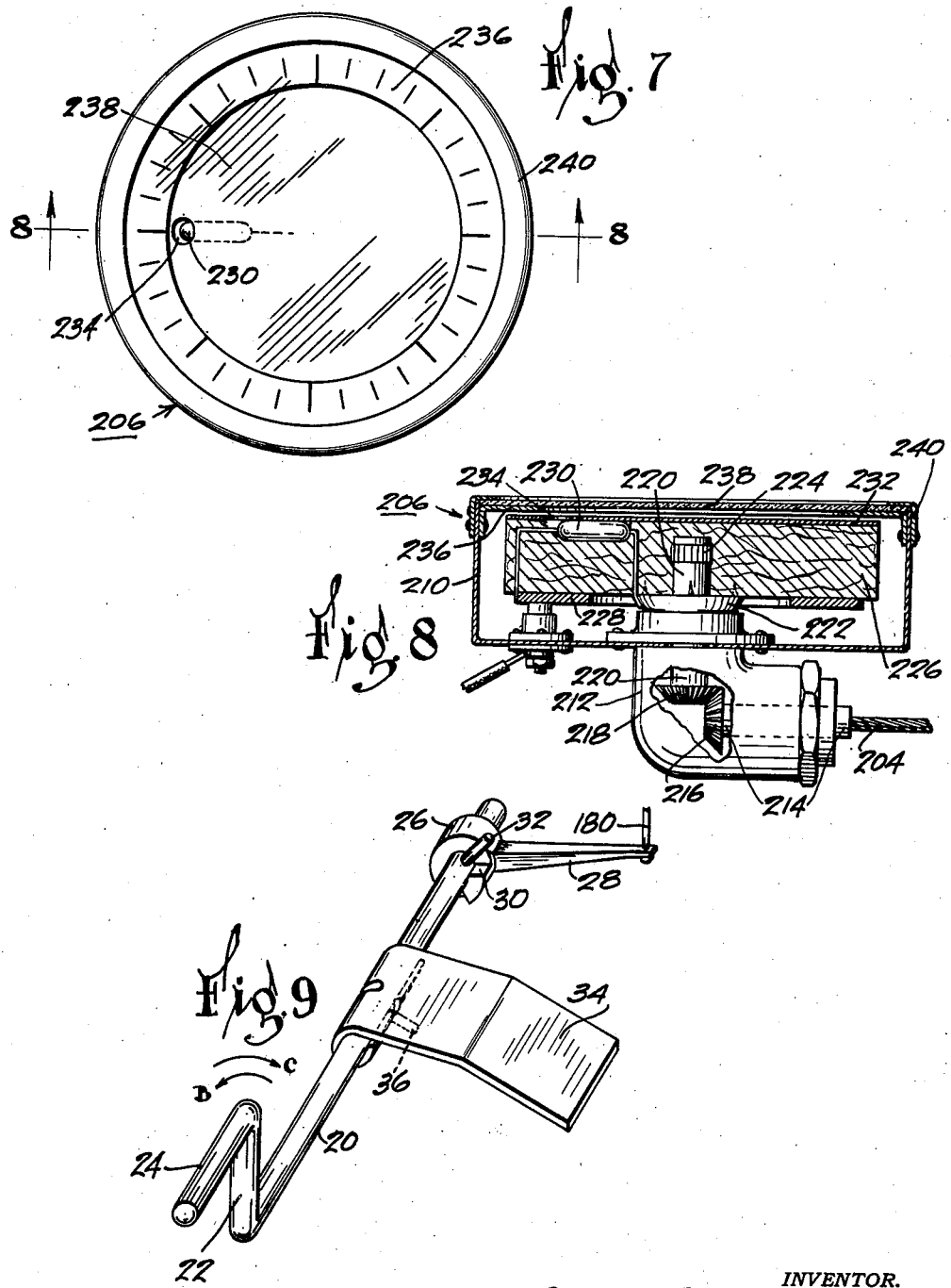
INVENTOR.
CLAUDE C BENNETT
BY
ATTORNEY.

Patented May 18, 1943

2,319,655

UNITED STATES PATENT OFFICE 2,319,655

WHEEL BALANCING APPARATUS

Claude C. Bennett, South Bend, Ind., assignor to A. E. Feragen, Inc., Seattle, Wash., a corporation of Washington Application June 24, 1939, Serial No. 281,032

2 Claims. (Cl. 73—53)

This invention relates to apparatus for testing the balance or unbalance of wheels, and more particularly to testing both the static and dynamic balance of wheels.

It is well known that static unbalance of a wheel results from non-coincidence of the center of gravity with the geometric center of the wheel, and that dynamic unbalance of a wheel is due to an inequality in the distribution of weight in planes normal to the turning axis of the wheel, generally in the median plane of the wheel.

The present invention aims to provide an apparatus operative to quickly and accurately indicate both the static and dynamic balance or unbalance of a wheel, and to indicate approximately the extent of unbalance.

In the drawings forming a part of this specification—

Fig. 1 is a front elevation of a wheel balancing apparatus embodying the invention;

Fig. 2 is a side elevation of the wheel balancing apparatus;

Fig. 3 is an enlarged fragmentary view illustrating the saddle, the mounting thereof, and the make-and-break switch;

Fig. 4 is a sectional view taken substantially on the line 4—4, Fig. 3, looking in the direction indicated;

Fig. 5 is a top plan view of the dial for indicating the extent of unbalance.

Fig. 6 is a cross-sectional view taken substantially on the line 6—6, Fig. 2, looking in the direction indicated;

Fig. 7 is a top plan view of the dial for indicating balance or unbalance;

Fig. 8 is a sectional view substantially on line 8—8, Fig. 7.

Fig. 9 is a perspective view of the control mechanism, the clutch actuating means, and the brake; and Fig. 10 is a diagrammatical view of the electric circuit for the apparatus.

Referring to the drawings for more specific details of the invention, 10 represents generally a frame comprising a base 12 supporting corresponding streamlined pedestals 14 and 16 arranged in spaced relation to one another and braced by a housing 18 suitably secured to the base and to the opposed walls of the pedestals.

A shaft 20 supported transversely of the frame in suitable journals on the pedestals 14 and 16 has on one end thereof an arm 22 terminating in a pedal or crank 24 at one side of the frame. A hub 26 sleeved on the other end of the shaft has thereon an arm 28 and a stop 30 for cooperation with a pin 32 carried by the shaft, the purpose of which will hereinafter appear. The shaft also has mounted thereon a brake shoe 34 attached to the shaft centrally between the pedestals 14 and 16 by an overrunning connection 36. Movement of the pedal or crank 24 in one direction actuates the arm 28, and movement of the crank in the reverse direction actuates the brake shoe 34.

Each of the pedestals 14 and 16 has on its top spaced upwardly extended projections 38, preferably arranged in pairs, and bolted or otherwise secured to these projections are corresponding bars or rails 42 and 44. The rails are supported respectively on the respective pedestals in spaced parallel relation to one another transversely of the frame 10 and normal with respect to the vertical axis of the frame. The rails extend forwardly of the frame, and corresponding smoothly finished bearing plates 46 and 48 suitably mounted on the forward ends of the rails serve to properly support a wheel under test as to its static balance or unbalance.

Corresponding saddles 50 and 52 are pivotally mounted on the rails 42 and 44 in oppositely disposed relation to one another. Preferably the vertical axes of the saddles coincide with the vertical axes of the pedestals. As shown, the rails 42 and 44 are transversely bored for the reception of corresponding bearings 54. Each of the saddles includes a triangular body 56 having forwardly and rearwardly extended arms 58 and 60. The body is bifurcated as at 62 for the reception of the rail, and opposed adjustable studs 64 mounted in the body have frustroconical ends 66 received by the bearings. One of the studs is elongated, the purpose of which will hereinafter appear, and locknuts 68 on the studs serve to secure the studs against displacement. The body of the saddle is also bifurcated as at 70, and mounted in the body transversely of this bifurcation and in spaced relation to one another are pins 72 and 74 supporting bearings 76 and 78.

The body of the saddle also has transverse bores 80 and 82 arranged adjacent and in parallel relation to the bearings 76 and 78. The bore 80 has secured therein a pin 84, and a yoke 86 pivotally mounted on this pin within the bifurcation has a semi-circular notch 88 arranged centrally thereof for cooperation with the bearings 76 and 78, and a transverse bore 90 in the free end of the yoke is adapted to register with the bore 82 when the yoke is in lowered position so that a pin 92 may be slipped in the bores 82 and 90 to effectively lock the yoke against movement.

In the upper face of each of the rails 42 and 44 are recesses 94 and 96 arranged equi-distant from the saddle. Compression springs 98 and 100 seated in these recesses are received by oppositely disposed recesses 102 and 104 in the arms 58 and 60, and thumb screws 106 and 108 mounted for travel in the arms abut the springs with suitable bearing disks interposed and provide desirable means for adjusting the load on the springs so as to yieldingly support the saddle in perpendicular position.

Make-and-break switches 110 and 112 are mounted on the rails 42 and 44, and connected in an electric circuit controlled by switches 256 and 258 respectively, to be hereinafter described. Each of the switches includes a block 114 of suitable insulating material fixedly secured to the bottom of the rail, and a flexible blade 116 secured to the block has adjacent its free end a dependent contact 118. A similar blade 120 also supported on the block 114 has an upwardly extended contactor 122 for cooperation with the contact 118. The blade 120 extends beyond the blade 116 so as to support a rod 124 slidable in a bore in the rail, and a set-screw 126 mounted in the arm 60 on the saddle engages the rod 124. By manipulating the screw, the gap between the contact and contactor may be regulated.

Means for determining the extent of off balance of a wheel under test is carried on the arm 60 of the saddle 50. As shown, a dial 128 is mounted on the arm 60 in concentric relation to the adjusting screw 126. The dial has a scale calibrated in ounces, as indicated at 130, and a pointer 132 is rotatably mounted on the screw 126 for cooperation with the scale. A spring 134 sleeved on the screw 126 between the face of the dial and the pointer supports the pointer in elevated position above the dial, and a thumb nut 136 on the screw serves to retain the pointer in adjusted position.

A bracket 138 suitably secured to the pedestal 16 of the frame supports a collar 140, and fixedly secured in the collar is a hollow shaft 142 supporting a friction clutch indicated generally at 144. The clutch includes a rotatable clutch member 146 mounted on a bearing 148 supported on the hollow shaft. This clutch member has suitably secured to its face a friction lining 150, and a universal joint member 152 is fixedly secured concentrically thereof for cooperation with a universal joint member 154 having integral therewith a driving shaft 156 extended through the hollow shaft and terminating in a ball 158 having a plurality of flats 160, the object of which will hereinafter appear.

A combined pulley and clutch member 162 is rotatable on a bearing 164 shiftably mounted on the hollow shaft 142, and a spring 166 on the hollow shaft between the bearings 148 and 164 serves to normally retain the clutch members in spaced relation to one another. A thrust ring or collar 168 is free to move on the hollow shaft and serves to transmit force to the bearing 164 so as to shift the clutch member 162 into engagement with the clutch member 146. The bracket 138 has a dependent ring 170 supporting a saddle 172, and a lug 174 on the ring has pivotally mounted thereon a clutch lever 176 having a fork 178 straddling the hollow shaft 142 and adapted to engage the thrust collar 168,
and the clutch lever 176 is connected as by a cable or Bowden wire 180 to the lever 28 on the shaft 20. A motor 182 of any preferred type is mounted in the saddle 172 and connected to a suitable source of electrical energy, and the rotor shaft of the motor has fixedly secured thereto a pulley 184 connected as by a belt 186 to the pulley of the combined rotatable shiftable pulley and clutch member 162 on the hollow shaft 142.

A shaft or spindle 188 supported for rotation on the bearings 76 and 78 of the respective saddles 50 and 52 has thereon a retaining ring 190, and opposed cones 192 and 194 sleeved on the spindle are clamped between the retaining ring and a nut 196 threaded on the spindle, with suitable spacers 198 and 200 interposed. The spindle 188 supports a wheel, the dynamic balance or unbalance of which it is desired to determine, and the cones 192 and 194 serve to properly adjust the wheel on the spindle and to secure the wheel to the spindle. It is, of course, to be understood that the cones and the spacers may be varied to suit the structural characteristics of any wheel that it may be desired to test.

The spindle 188 has in one end thereof an axial recess 202 for the reception of the ball 158 on the driving shaft 152. This union between the driving shaft and the spindle is in the nature of a universal joint providing for free movements of the spindle, and suitably attached to the other end of the spindle 188 is a flexible driving shaft 204 connected to an instrument 206 for indicating the dynamic balance or unbalance of a wheel under test.

The instrument 206 includes a housing 208 pivotally attached to the pedestal 14 and adapted to be supported in an upright position by the elongated stud 64 on the saddle 50. The housing encloses suitable switches for control of the electric circuit to be hereinafter described, and supported on the housing is a case 210 having mounted in the bottom thereof and depending therefrom a bent sleeve 212. A shaft 214 journaled in the depending end of the sleeve is connected to the flexible shaft 204, and on this shaft is a beveled gear 216 in mesh with a beveled gear 218 on a shaft 220 supported for rotation in the sleeve 212 concentrically of the case. The shaft 220 has thereon a collar 222 and a knurled section 224. A disk 226 of suitable insulation material is mounted on the shaft 220 and held against relative rotation by the knurled section 224. The disk 226 carries on its bottom face a contact ring 228, and a neon lamp 230 fitted in a recess in the upper face of the disk 226 has its positive terminal connected to the ring 228 and its negative terminal connected to the collar 222. The disk has suitably secured to its upper face a rotatable finished face plate 232 provided with an opening 234 registering with the lamp 230 so that light from the lamp may be visible through the opening. A non-rotatable annular dial 236, calibrated as indicated, is secured to the wall of the case 206 above the disk 226 for cooperation with the lamp, and a glass cover 238 superimposed on the dial is held against displacement as by a retaining ring 240 suitably secured to the wall of the case.

The electrical circuit for the machine is illustrated in Fig. 10. As shown, a transformer 242 including a primary coil 244 and a secondary coil 246 has one terminal 248 of the primary connected as by a lead 250 to a feed line, and the other terminal 252 of the primary connected as by a lead 254 to independent snap switches 256 and 258 connected respectively by leads 260 and 262 to the make-and-break switches 110 and 112 respectively grounded as indicated at 268 and 270.

The secondary coil 246 of the transformer has one of its terminals 272 grounded, as indicated at 274, and its other terminal 276 connected by a lead 278 to a brush 280 cooperating with a rotatable member 228 connected by a lead 284 to one terminal of neon lamp 230, the other terminal of the lamp being grounded, as indicated at 288. The rotatable member and lamp correspond to like instrumentalities in the indicating instrument.

In operation, the spindle 188 is dismounted and a wheel selected for test is fitted thereon between the cones 192 and 194 so that the median plane of the wheel intersects the axis of the spindle at right angles. The spindle, with the wheel so mounted thereon, is then placed on the forward end of the rails 42 and 44 with its respective ends resting on the plates 46 and 48. Now, by gently rotating the wheel, together with the shaft, a number of times, the wheel will invariably come to a stop each time with the heaviest portion thereof down, thus indicating the static unbalance. This unbalanced condition may be corrected or compensated for by counterweighing the diametrically opposite portion of the wheel.

After compensating for the static unbalance of the wheel, the spindle 188 with the wheel thereon is transferred to the saddles 50 and 52, where the spindle is supported on the rollers 76 and 78 with the recess 202 in one end of the spindle receiving the ball 158 on the drive shaft 156 and the other end of the spindle connected to the flexible shaft 204, and to avoid displacement of the spindle the yoke 86 is then lowered and secured in place.

Now, the operator adjusts the set-screws 106 and 108 to set the vertical axes of the saddles 50 and 52 perpendicular, and also adjusts the make-and-break switches 110 and 112 and sets the pointer 132, at zero. The operator then closes the motor circuit by actuation of a switch 253 so as to energize the motor, and thereafter actuates the clutch pedal 24 to engage the clutch member 146 with the clutch member 162. Force is now transmitted through the clutch to the spindle 188. This results in rotation of the spindle, and, accordingly, the wheel thereon. When the wheel is rotating at a desired speed the clutch pedal 24 may be released and the wheel permitted to rotate freely.

Now, the snap switches 256 and 258 controlling the circuit are intermittently or simultaneously closed. Under this condition, if the wheel is in dynamic balance, the shaft will rotate on a stationary axis. However, if the wheel is unbalanced on either side of the median plane, the unbalanced portion will tend to approach the median plane twice during each revolution. This results in rocking either of the saddles 50 or 52, depending upon the side of the wheel out of balance. Rocking of either of the saddles closes one or the other of the make-and-break switches 110 and 112 and completes the circuit, resulting in the lighting of the lamp 230, and thus indicating on the dial 236 the side of the wheel out of balance, and the extent of the unbalanced condition is indicated by the duration of the light. Under this condition, by adjusting the pointer 132 to increase the gap of the switch until the rocking of the shaft fails to cause the contacts of the switch to close, the adjusted position of the pointer indicates on the associated dial in ounces the extent of the unbalanced condition, and this condition can be compensated for by attaching counter weights to the wheel.

Upon conclusion of the test, the foot pedal or crank 24 is reversed. This operation results in release of the clutch and actuation of the brake shoe 34 into engagement with the periphery of the wheel, so as to effectively retard rotation of the wheel.

To determine the point of dynamic unbalance of the wheel, the lamp 230 and opening 234 are positioned opposite the graduation on the dial 236 where the lamp 230 is first lighted by manual rotation of the wheel or spindle. The topmost point of the wheel then indicates the point at which the unbalanced condition of the wheel became effective to actuate the arms 58 and 60 operably connected to the instrument 206 by switches 110 and 112 to indicate dynamic unbalance of the wheel. Due to the fact that a short interval of time is required to enable the unbalanced condition to actuate the arms 58 and 60, allowance must be made for this lag by placing the counterbalancing weights angularly a suitable distance from the topmost portion of the wheel.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A wheel balancing device comprising a pair of spaced pedestals, horizontally disposed rails carried by the pedestals, angularly movable saddle members pivotally mounted on the pedestals, forwardly and rearwardly extending arms carried by the saddle members and positioned to overlie said rails, spaced bearings in the saddle members, a wheel supporting spindle adapted to engage said bearing members, a yoke pivotally mounted on each of the saddle members and positioned to overlie the wheel supporting spindle, means to drive the spindle comprising a shaft aligned with the spindle, universal driving means between said shaft and spindle, a clutch member operably connected to said shaft, a second clutch member concentrically mounted on the shaft and manually movable into engagement with said first mentioned clutch member, power means to rotate said second clutch member, means to disengage the two clutch members and thus release the spindle and wheel for free rotation, an indicator comprising a graduated dial and a rotatable member including a light operably connected for rotation with the spindle, means comprising switches carried by the pedestals and operable by substantially predetermined angular movement of said saddle relative to its associated rail to energize the light, means to vary the resistance to the force developed by dynamic unbalance of a rotating wheel which moves each angularly movable saddle relative to its associated rail to actuate its associated switch to indicate the degree of dynamic unbalance, and manually operable means to selectively interconnect the light with one of said switches.

2. In a wheel balancing device, a pair of spaced pedestals, spaced saddle members having body portions rockably mounted on the pedestals, yielding means between the pedestals and saddle members to urge the saddle members towards a substantially predetermined angular position relative to the pedestals, a wheel supporting spindle, spaced bearing means carried by the body portions of each of the saddle members and positioned to support said wheel carrying spindle, spaced yokes pivotally mounted to the body portion of each of said saddle members and movable between positions to lock the spindle in predetermined relation to said bearing members and to release the spindle, a driving shaft aligned with the spindle, cooperating clutching means to drive and release said shaft, electric contact means carried by the pedestals, indicating means including a rotatable lamp driven by the spindle and a fixed housing including a dial, manually operable means to selectively interconnect the lamp with each of the contact means whereby the lamp will be selectively energized upon substantially predetermined angular movement of each of said saddle members relative to its associated pedestal, manually operable means to vary the resistance to the force due to unbalance tending to move each of the saddle members relative to its associated pedestal to energize said lamp, and means to indicate the degree of unbalance.

CLAUDE C. BENNETT.